United States Patent [19]

Slavejkov et al.

[11] Patent Number: 5,547,368
[45] Date of Patent: Aug. 20, 1996

[54] PROCESS AND DEVICE FOR COMBUSTION-ENHANCED ATOMIZATION AND VAPORIZATION OF LIQUID FUELS

[75] Inventors: Aleksandar G. Slavejkov, Allentown, Pa.; Lee Broadway, Leesburg, Fla.; Mahendra L. Joshi, Calgary, Canada; James K. Nabors, Apopka, Fla.

[73] Assignees: Air Products and Chemicals, Inc., Allentown, Pa.; Combustion, Tec. Inc., Apopka, Fla.

[21] Appl. No.: 24,557

[22] Filed: Mar. 1, 1993

[51] Int. Cl.$^6$ ............................................. F23D 21/00
[52] U.S. Cl. ........................... 431/8; 431/10; 431/187; 431/353
[58] Field of Search ..................... 431/8, 10, 181, 431/187, 182, 183, 184, 185, 186, 188, 189, 353

[56] References Cited

U.S. PATENT DOCUMENTS

| | | | |
|---|---|---|---|
| 1,344,029 | 6/1920 | Fisher | 431/186 |
| 2,862,545 | 12/1958 | Snow et al. | 431/8 X |
| 3,711,243 | 1/1973 | Zink et al. | 431/181 X |
| 3,753,658 | 8/1973 | Henderson et al. | 431/189 X |
| 3,836,315 | 9/1974 | Shular | 431/188 X |
| 4,383,820 | 5/1983 | Camacher | 431/8 |
| 4,451,230 | 5/1984 | Bocci et al. | 431/189 X |
| 4,602,571 | 7/1986 | Chadshag | 431/188 X |
| 4,915,619 | 4/1990 | La Rue | 431/187 X |
| 5,147,199 | 9/1992 | Perthuis et al. | 431/187 X |
| 5,169,304 | 12/1992 | Flament et al. | |

*Primary Examiner*—Carl D. Price
*Attorney, Agent, or Firm*—James C. Simmons

[57] ABSTRACT

Method and apparatus for generating oxy-liquid fuel with lowered $NO_x$ products using low pressure oxygen to atomize liquid fuel and produce an oxy-liquid fuel flame and surrounding the oxy-liquid fuel flame by an oxidizer, confining the oxy-liquid fuel flame and oxidizer in a precombustor for a distance determined by the rate of flame propagation and the diameter of the pre-combustor.

9 Claims, 7 Drawing Sheets

PROCESS AND DEVICE FOR COMBUSTION-ENHANCED ATOMIZATION AND VAPORIZATION OF LIQUID FUELS

FIELD OF THE INVENTION

The present invention pertains to oxy-liquid fuel heating for producing elevated temperatures in industrial melting furnaces for such diverse products as metals, glass, ceramic materials and the like.

BACKGROUND OF THE INVENTION

In conventional liquid-fuel burners, liquid fuel atomization is effected by means of a single liquid-fuel jet or multiple liquid-fuel jets surrounded by a high velocity atomizing stream that is usually air, steam, oxygen or other gases used in the burner. The atomizing medium travels at velocities greater than approximately 100 meters per second for "air-blast atomizers" and up to sonic velocity for "air-assist atomizers", to cause the liquid-fuel to break up into small droplets suitable for combustion. For air-assist atomizers, the supply pressure of the atomizing medium, the angle of impact between the liquid jet and the flow rate of high velocity atomizing medium stream determines the mean drop size distribution. However, the use of high pressure oxygen as an atomizing medium, instead of an air stream or other atomizing gases in oxygen-fuel fired burners leads to a chain of operational problems. First, the expansion of high pressure atomizing oxygen at the burner tip results in a high oxygen velocity, which thoroughly mixes with liquid fuel during the atomization process. The liquid fuel-oxygen mixture thus formed is readily combustible in a high temperature environment. The absence of inert nitrogen and highly reactive oxygen promotes rapid and uncontrolled combustion resulting in a very high temperature flame in the vicinity of the oxy-fuel burner tips which generally leads to the following conditions:

1. Deterioration/oxidation of burner nozzles.
2. Damage to burner block refractory material, which sometimes melts and obstructs the normal flame direction inside the burner block cavity.
3. Undesirable heating of furnace sidewalls, which is also a heat loss to the surroundings.
4. Short flame, due to smaller droplet-size distribution and higher reaction rates, coupled with non-uniform heat distribution to the furnace load.
5. Increased volatilization of certain batch ingredients, e.g. in the manufacture of glass PbO, Boron-containing species, etc.
6. Decreased productivity in pure product quality.
7. Shorter burner nozzle life and increased maintenance.

The economics of the process are also affected by the type of atomization used. In general, a high pressure liquid oxygen supply is relatively more expensive than a low-pressure gaseous oxygen produced by pressure or vacuum swing (PSA or VSA) adsorption units at the site. The use of high-pressure atomizing oxygen requires either a separate liquid oxygen storage and high-pressure supply system or a special oxygen compressor, to boost a low-pressure gaseous oxygen produced in PSV/VSA type units to high pressure required for atomization. Either scheme adds to the cost of utilizing oxygen in a liquid-fuel burner, thus increasing production costs for the user.

Furthermore, it has been observed that the use of high pressure oxygen for atomization (greater than 10 psig) leads to a very noisy and intense oxy-fuel flame, which has limited latitude, as far as flame shape or length control is concerned. The flame momentum is extremely high, due to high combustion velocities, which may result in overheating of burner tips, burner block, and furnace refractory.

SUMMARY OF THE INVENTION

In order to overcome problems with the prior art oxy-liquid fuel burners, a method and apparatus has been discovered for combustion-enhanced atomization and vaporization of liquid fuels in a combined oxy-fuel burner and precombustor. The method and apparatus of the invention permits use of a low pressure atomizing medium, preferably oxygen, to break up multiple liquid fuel jets in a center nozzle assembly by aerodynamic shearing followed by a combustion-induced vaporization of the liquid fuel in the precombustor. The precombustor is a generally cylindrical chamber of a defined length and diameter in which atomization and vaporization of liquid fuel spray is carried out in a central flame region with the remaining oxidizer for combustion is distributed through an annular or multiple radially distributed jets around the central flame region.

DETAILED DESCRIPTION OF THE INVENTION

Figure 1:
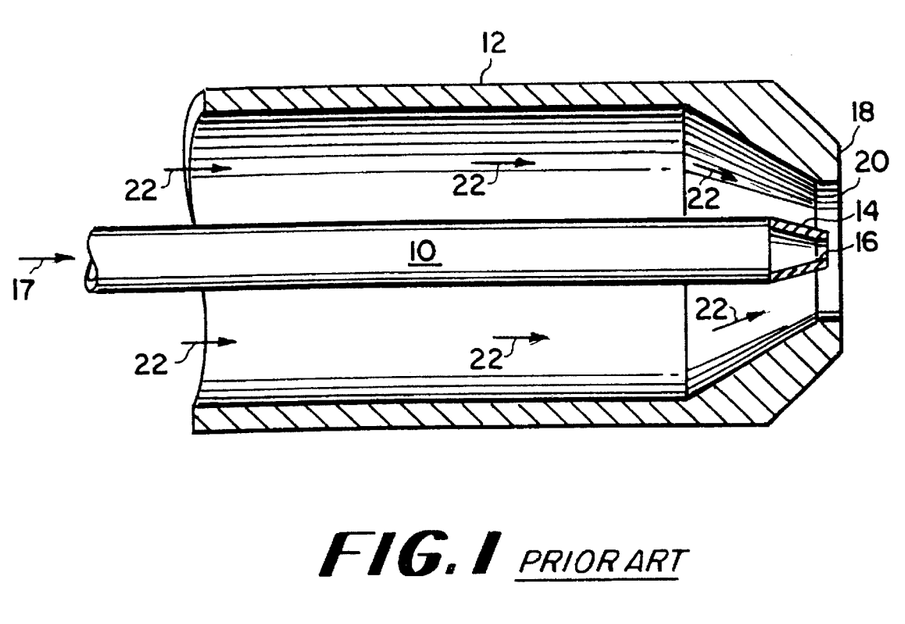
FIG. 1 is a longitudinal fragmentary view partially in section of a conventional liquid-fuel atomization device.
Figure 2:
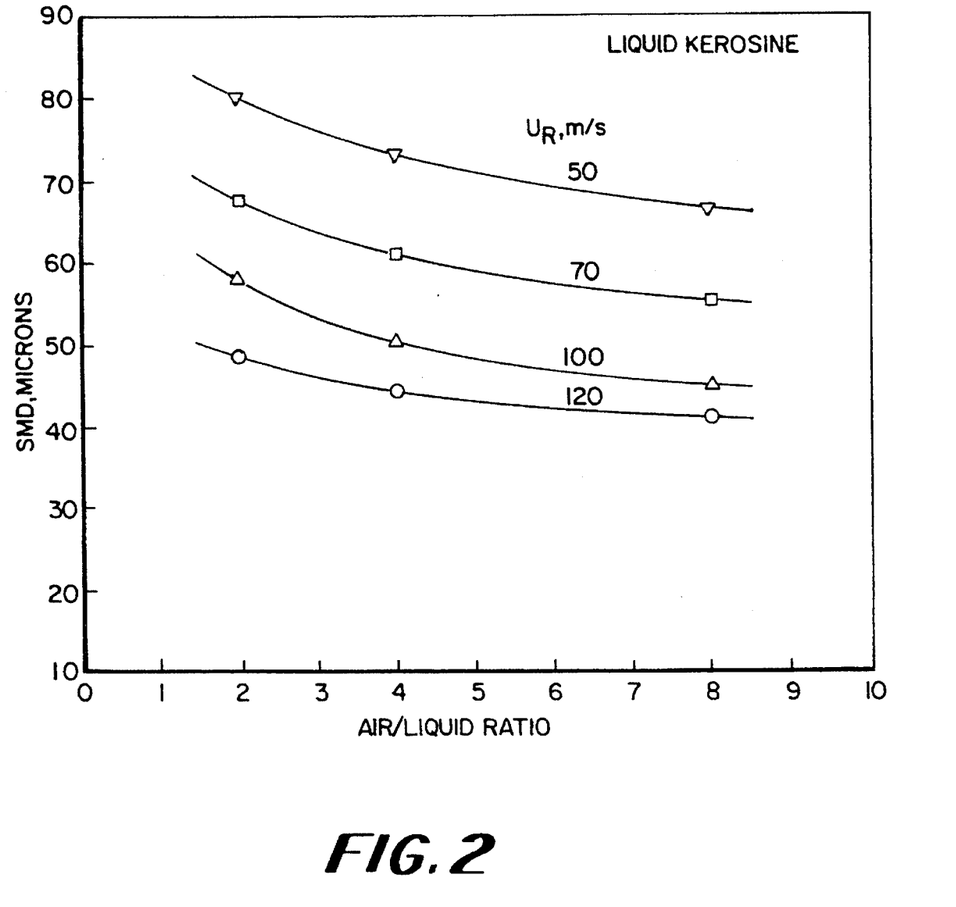
FIG. 2 is a plot of Sauter mean diameter as a function of the air-liquid ratio for an atomizer such as shown in FIG. 1.

As stated above, prior art liquid-fuel burners have been used to heat industrial furnaces for various applications. As shown in FIG. 1, a conventional liquid fuel atomization apparatus for achieving atomization of the fuel for combustion generally comprises a fuel conduit 10 disposed inside of a housing or nozzle 12. The forward end of fuel conduit 10 terminates in a tapered nozzle section 14 with a nozzle orifice 16. The fuel conduct (pipe) 10 can include a single orifice or a plurality of orifices depending upon the type of burner and the liquid fuel. The nozzle 12 has a forward section 18 which is tapered to a nozzle opening 20. In operation, fuel is admitted to the fuel pipe 10 as shown by arrow 17. Atomization fluid, e.g. air, steam, oxygen or other gases is introduced into the nozzle 12 as shown by arrows 22. The constriction of the flow of the high pressure atomization fluid by the orifice 20 serves to break up the liquid fuel into small droplets suitable for combustion. For air-assist atomizers, the supply pressure of atomizing medium, the angle of impact between the liquid jet and the flow rate of high velocity atomizing medium determines the mean drop size distribution. FIG. 2 illustrates the mean droplet diameter (Sauter mean diameter, SMD) as a function of the air-liquid ratio for an atomizer such as shown in FIG. 1. Previous studies by N. K. Rizk and A. H. Lefebvre in an article entitled, "Influence of Atomizer Design Features on Mean Drop Size", published in the A1AA Journal, Vol.21, No.8, August 1983, beginning at page 1193, conclude that atomization quality of liquid fuel (fuel oils, kerosene, etc.) is improved by increases in the atomizer air/fuel ratio and atomizing medium (air) velocity. This approach for improving atomization characteristics of various liquid fuels with high pressure atomizing air, typically at 40 to 80 psig, is common in air-fuel fired burners currently used in high temperature environments such as glass furnaces.

Figure 3:
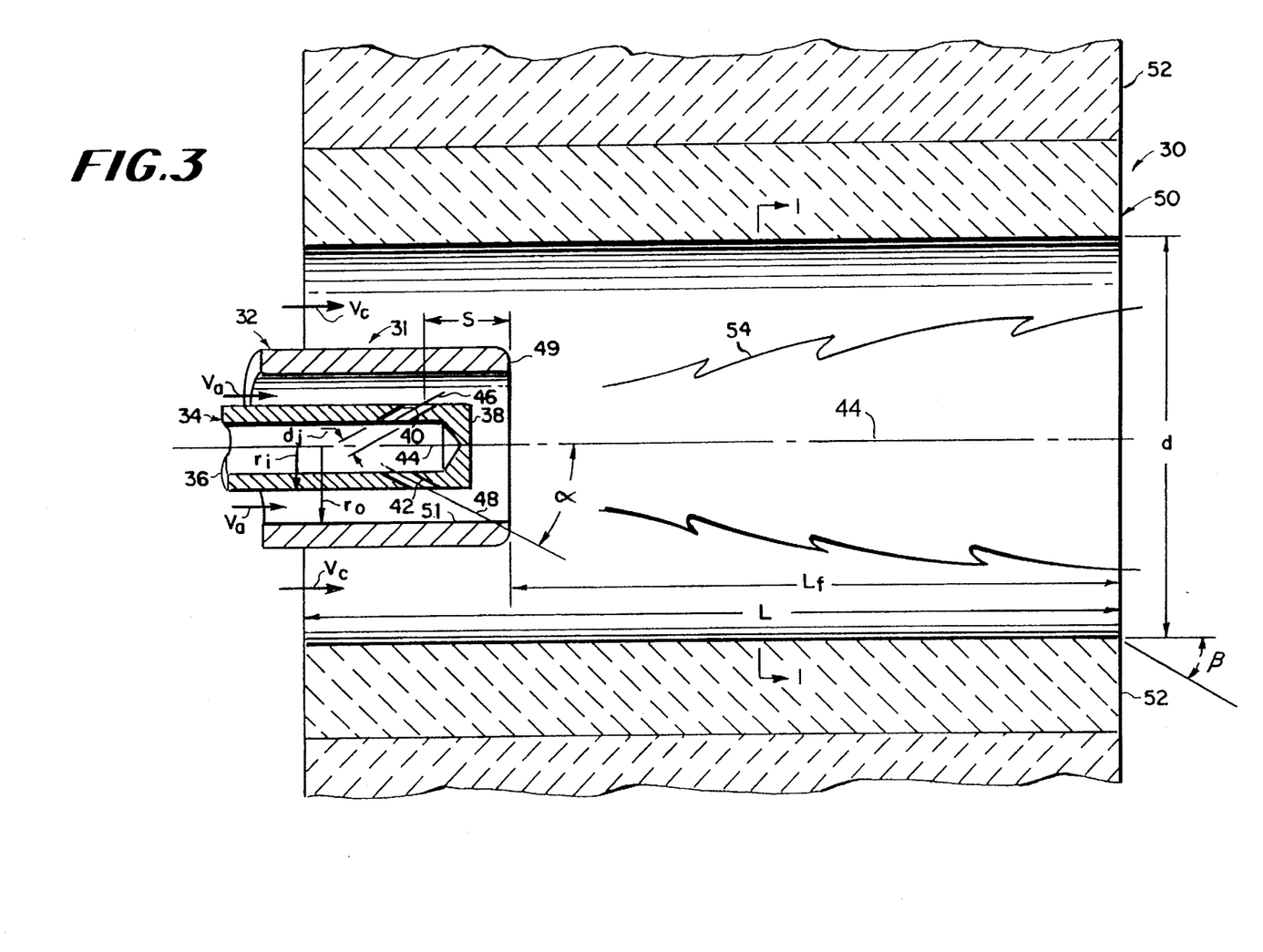
FIG. 3 is a longitudinal fragmentary view in section of a device embodying the present invention.

Referring now to FIG. 3, the present invention is embodied in the combination of an oxy-liquid fuel burner and precombustor shown generally as 30. The burner portion of the assembly 30 is shown generally as 31 and includes a central fuel conduit 34 surrounded by an atomizing tube or housing 32. Central fuel conduit 34 has a first end shown generally as 36 which adapts the fuel conduit to be connected to a source of liquid fuel such as oil or kerosene as is known in the prior art. Fuel conduit 34 has a second or front end 38 which is closed so that fuel introduced into the conduit 34 is forced out through apertures 40, 42. Apertures 40, 42 are disposed at an angle to the longitudinal axis 44 of the oil fuel conduit 34 as shown by the central axis lines 46, 48 of apertures 40, 42. The angle of disposition shown as $\alpha$ is between 10° and 60° as will be hereinafter more fully explained. The diameter shown as $d_j$ is between 0.01" and 0.20" and the number of orifices will be between 2 and 12. The size and number of orifices will be selected depending upon the liquid fuel being used. The most commonly used fuel oils are diesel oil (#2 fuel oil) or Bunker-C (#6 fuel oil), or any other blend of fuel oils denoted by ASTM standards as suitable for combustion. The location of the nozzles from the forward end 49 of the atomizing tube 32 is shown by the letter S which distance is important and critical to the operation of the device and the process of the present invention. The arrows designated $r_o$ and $r_i$ show the distance between the center line of the fuel tube 34 and the inner wall 51 of atomizing tube 32 and the outer wall of the fuel conduit 34. Arrows designated $V_c$ designate the combustion oxidizer fluid. Combustion oxidizer fluid is any stream with oxygen concentration between 30% and 100% and the arrows $V_a$ designate the atomizing medium.

The oxy-liquid fuel burner 31 is disposed inside of the precombustor 50, the precombustor 50 being identical to that shown and described in U.S. patent application Ser. No. 07/860,652, filed Mar. 30, 1992, and U.S. patent application Ser. No. 07/860,651, filed on the same day. The specification of both the aforementioned patent applications being incorporated herein by reference. Generally the precombustor 50 is fabricated in a cylindrical shape from a well-known refractory furnace material. The precombustor has an inside diameter designated by the letter d and a length designed L. The precombustor 50 is adapted for mounting in a furnace wall shown as 52. The oxy-fuel burner 32 is positioned inside the combustor at a distance from the flame end 52 which is designated $L_f$. The flame end 52 of the precombustor 50 can have a converging or diverging shape (not shown) so long as the angle of convergence or divergence is no greater than ±15° as shown by the Greek letter $\beta$ in FIG. 3.

The device of the present invention, shown in FIG. 3, and the process embodied therein, enable a very low pressure atomizing medium such as oxygen, air, nitrogen, steam, propane, natural gas or any other gaseous medium, but in the case of the present invention is preferably oxygen, to break up multiple liquid fuel jets in a center nozzle assembly by aerodynamic shearing followed by a combustion-induced vaporization of the liquid fuel in the precombustor. The oil or other liquid fuel is introduced into the center of the fuel tube 34 and exits the jets 40, 42 where it is contacted by the low pressure atomizing medium, e.g. oxygen, designated by arrows $V_a$ which flows past the orifices 40, 42. This causes aerodynamic shearing and break up of the liquid fuel into droplets. The atomizing oxygen and fuel droplet mixture then exits the atomizing tube 32 wherein additional oxidizer shown by arrows $V_c$ introduced into the precombustor 50 contacts the atomizing oxygen fuel mixture resulting in a combustion flame shown as 54. The precombustor having a defined length L and a defined diameter d provides a sufficiently long residence time for vaporization of liquid fuel spray in the center flame region while combusting with the remaining oxidizer for combustion introduced in annular configuration around the central flame region as shown in the drawing. While the region between the outer surface of atomizing tube 32 of burner 31 and the inner surface of precombustor 50 is shown as an open annulus, introduction of additional oxidizer could be accomplished by using a plurality of tubes or a plate with a plurality or orifices surrounding the atomizing tube 32.

As set forth above, the oil tube terminates in an oil injection nozzle with a number of holes identified by the nomenclature $n_j$ wherein this value is between 2 and 12 where the size of the nozzles is identified by the nomenclature $d_j$ and the diameter is between 0.01" and 0.20" depending upon the firing capacity of the burner. The nozzles are distributed radially and are disposed at an injection angle $\alpha$ to the flow axis 44, the angle $\alpha$ varying between 10° and 60°. Low pressure atomizing medium ($V_a$) is generally oxygen at pressures less than 10 psig. The low pressure oxygen is introduced in an annular configuration (or through a multiple of radially-distributed jets) around the liquid fuel jets for atomization. During an oxy-liquid fuel firing, the amount of oxygen used as an atomizing medium and its pressure are maintained nearly constant; whereas, the combustion oxidizer is adjusted to satisfy the overall stoichiometry of the process. Furthermore, the axial location (S) of the liquid fuel injection orifices upstream of the atomizing tube outlet 49 is critical so that the aerodynamic shearing and mixing characteristics of the process are obtained. In the version shown in FIG. 3 the liquid fuel is injected slightly in advance to get the benefit of better aerodynamic shearing, flow vectoring and mixing inside the atomizing tube.

A relatively higher atomizing medium momentum inside the atomizing tube 32 is found to be very effective in overcoming the consolidating forces exerted by surface tension and liquid fuel viscosity at the mixing locations.

In the case of oxy-fuel firing, co-flowing liquid fuel-oxygen mixture is then vaporized, due to the combustion-generated heat inside the pre-combustor 50. A highly luminous flame 54, resulting from liquid fuel-oxygen combustion, provides a sufficient radiation directed backwards toward the fuel injection nozzle 34 and, in the process, vaporizes the liquid fuel droplets, leading to an enhanced rate of vaporization. This configuration also allows a greater mass of liquid fuel atomization per unit-mass of atomizing oxygen flow at a giving firing rate. With the method and apparatus of the present invention, atomization proceeds at a much lower atomizing fluid supply pressure (less than 10 psig using oxygen) and velocities, resulting in lower peak flame temperatures without any problems associated with high temperature flames.

Figure 4:
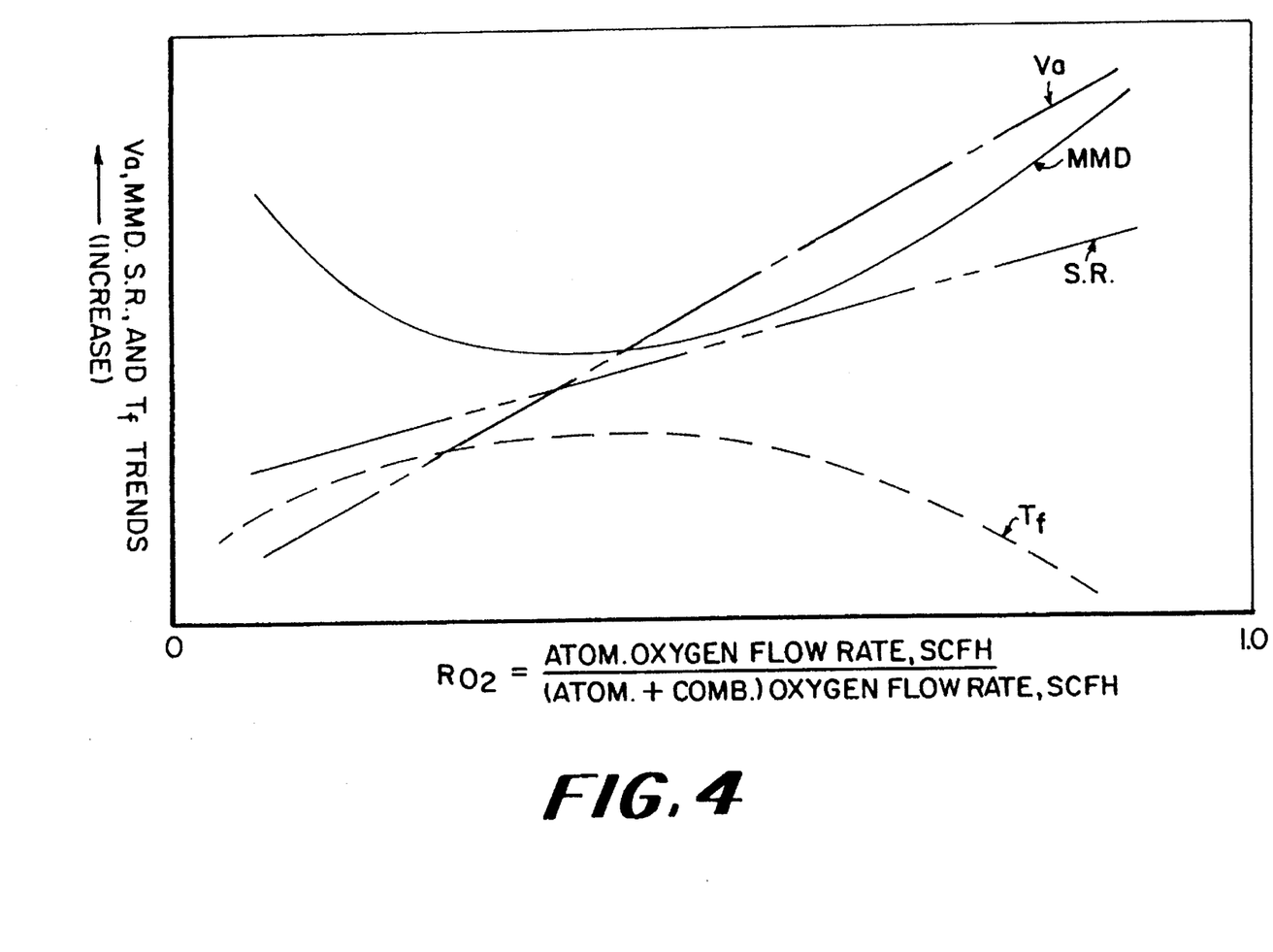
FIG. 4 is a plot of atomizing oxygen velocity ($V_a$), mean liquid fuel droplet diameter (MMD), local stoichiometric ratio (S.R.) and local flame temperature ($T_f$) as a function of atomization oxygen flow rate to total oxygen flow rate to total oxygen flow ratio ($R_{O_2}$) at section A—A inside the precombustor of FIG. 3.

The geometry of the device for combustion-enhanced atomization and vaporization is a function of the firing rate. For a firing rate of 0.75 to 3.00 million BTU per hour, 2.0 to 8.0 million BTU per hour and 4.0 to 20 million BTU per hour firing rates, the preferred dimensional ranges are given in Table 1 below.

varies between 0.05 to 0.50. The above choice of $R_{O_2}$ range is based on the degree of atomization, peak flame temperatures, precombustor/burner nozzle tip temperatures and general flame shape-length characteristics. The amount of atomizing medium (oxygen in present case) and its velocity ($V_a$) in the atomizing tube determines the degree of atomization and resulting flame characteristics. A qualitative influence of ratio $R_{O_2}$ and atomizing oxygen velocity $V_a$ on overall flame development is shown in FIG. 4. It shows that at Section A—A of FIG. 3, an increase in atomizing oxygen flow, with

TABLE I

| Firing Rate (MM BTU/Hr) | α (Degree) | $(r_o/r_i)$ | $V_f$ (Ft/Sec) | Ro2 | $V_a$ (Ft/Sec) | $n_j$ | $\frac{S}{(r_o - r_i)}$ | $\frac{P_{oil}}{P_{O_2}}$ | $L_f/d$ |
|---|---|---|---|---|---|---|---|---|---|
| 0.75–3.00 | 10–60 | 1.2–4.0 | 0.5–12 | 0.05–1.00 | 100–600 | 2–12 | 0.5–5.0 | 0.1–10 | 2–4 |
| 2.00–8.00 | 10–60 | 1.2–4.0 | 1.0–20 | 0.05–0.50 | 100–600 | 2–12 | 0.5–5.0 | 0.1–10 | 2–4 |
| 4.00–20.00 | 10–60 | 1.2–4.0 | 2.0–30 | 0.05–0.50 | 100–600 | 2–12 | 0.5–5.0 | 0.1–10 | 2–4 |

NOTES:
1. α = Liquid fuel injection angle with respect to flow axis
β = Convergence or Divergence angle of Precombustor
d = Diameter of Precombustor
$d_j$ = Diameter of liquid fuel orifice
L = Overall length of precombustor
$L_f$ = Length of flame region inside precombustor
$n_j$ = No. of liquid fuel jets
$V_a$ = Velocity of atomizing medium
$V_c$ = Velocity of combustion oxidizer
$V_f$ = Velocity of liquid fuel
$Ro_2 = \frac{\text{Atomizing oxygen flow rate (SCFH)}}{\text{Total oxygen flow rate (SCFH)}}$
$r_o$ = Inside radius of atomizing tube
$r_i$ = Outside radius of fuel injection nozzle
s = Liquid fuel injection location with respect to atomizing tube exit plane
$P_{oil}$ = Fuel oil pressure at fuel injection nozzle
$P_{O_2}$ = Atomizing oxygen pressure at atomizing tube inlet
S.R. = Stoichiometric Ratio
2. The ratio $Ro_2$ indicates a dual use of oxygen as an atomizing medium and for fuel combustion.
3. The velocity $V_a$ indicates the atomizing oxygen velocity range.

The numbers given in Table I are empirical values, derived from the measurements of flame length, shape, degree of liquid fuel atomization, precombustor temperature profile and temperatures of burner nozzle parts.

For proper liquid fuel combustion processes, the liquid fuel injection velocity should be between 0.50 to 30 feet per second within 0.75 to 20 million BTU per hour firing range which is about 5 to 146 gallons per hour of #2 fuel oil (diesel) flow rate. Many gases, e.g. air, oxygen, steam, propane, natural gas, $CO_2$, etc., can be used as an atomizing media to atomize liquid fuels. The use of air would be economical but it would produce additional $NO_x$ emissions in high temperature furnace applications. Other atomizing fluids such as steam, $CO_2$, nitrogen or other inert gases are potential candidates. However, oxygen is the preferred atomizing medium.

In Table I, oxygen is considered for both atomizing medium as well as oxidizer for the fuel. Depending on firing rate, as shown in FIG. 3, a certain portion of oxygen at required pressure is passed through the atomizing passage for liquid fuel atomization; whereas, the remaining oxygen is transferred through the annular passage around the atomizing tube, to enable formation and stabilization of a two-phase turbulent diffusion flame inside the precombustor and for completion of combustion inside the furnace. The ratio $R_{O_2}$ (the fraction of atomizing oxygen to total oxygen flow rate) ranges from 0.05 to 1.00 for a 0.75 to 3.00 MM BTU/Hr firing rate. The ratio $R_{O_2}$=0.05 is used during high firing rate; whereas, $R_{O_2}$=1.0 may be used for a low firing rate. For a 2.0 to 20.0 MM BTU/Hr firing rate, the ratio $R_{O_2}$ respect to the total oxygen flow (increase in $R_{O_2}$), would increase the atomizing $O_2$ velocity ($V_a$), which causes greater aerodynamic shear in the atomizing tube and is followed by the combustion-induced vaporization of fuel droplets. This is shown by an initial increase in the flame temperature ($T_f$), associated with improved stoichiometry and reduction in mass medium diameter (MMD) of the fuel droplets. Further increase in ratio $R_{O_2}$, S. R. and $V_a$ results in quenching of the local flame region by excessive atomizing oxygen flow, which decreases the flame temperature and radiative heat flux from the flame region inside the precombustor. A reduced heat flux from the flame generally reduces the liquid fuel evaporation rate and thus reduces the combustion-enhanced atomization effect on the fuel. This is shown by an increase in mean liquid fuel droplet diameter (MMD).

Figure 5:
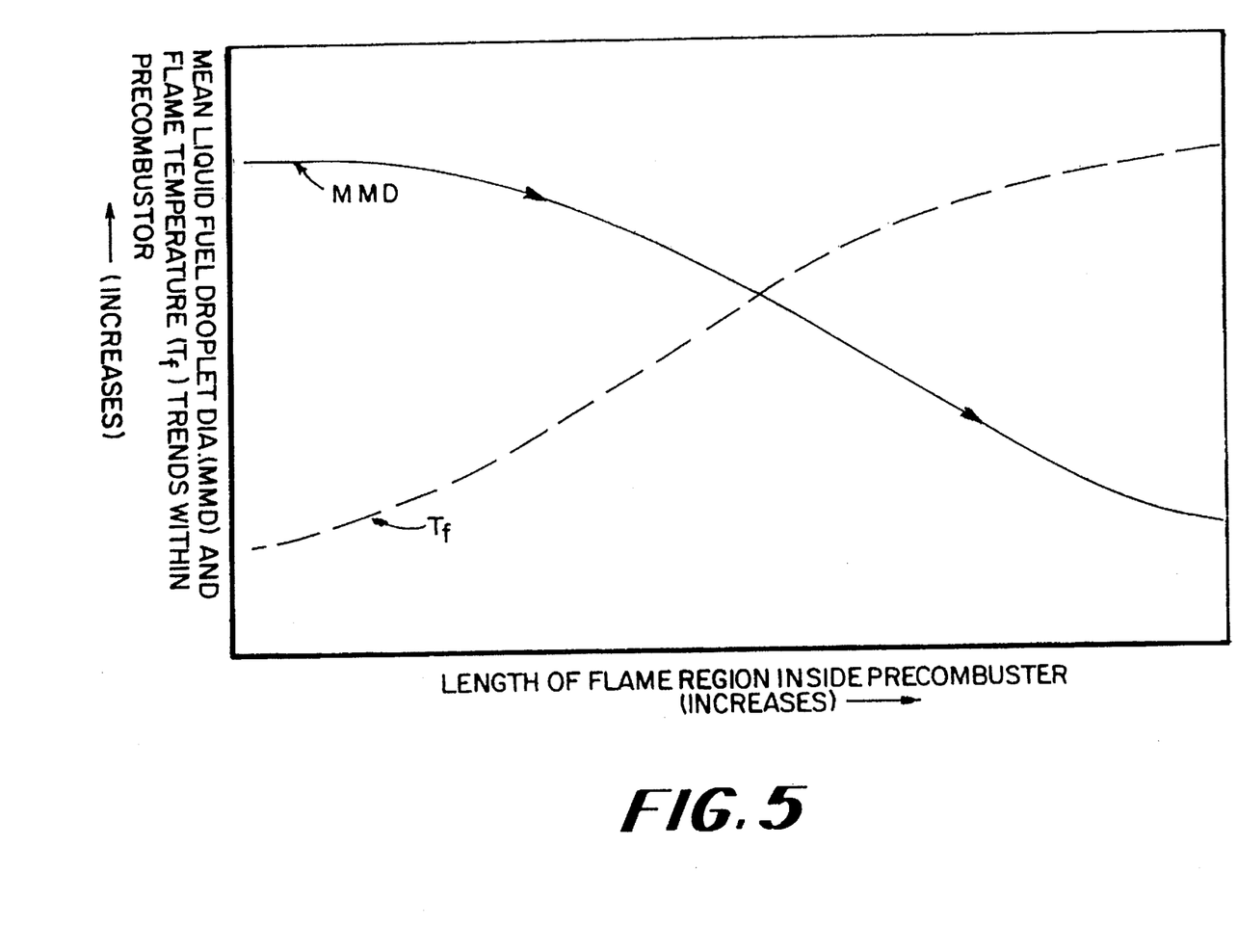
FIG. 5 is a plot of mean liquid fuel droplet diameter (MMD) and flame temperature ($T_f$) as a function of the length of flame region inside the precombustor of FIG. 3.

FIG. 5 shows a general trend in flame temperature ($T_f$) and mean liquid fuel droplet diameter (MMD), as a function of the flame region length inside the precombustor. The above trend is possible with the preferred flow configuration for the combustion oxygen, as shown in FIG. 3. Previous work with gaseous fuels has shown that the velocity of combustion oxygen ($V_c$) should be less than 600 feet per second and preferably in an annular configuration around the atomizing tube.

Figure 6:
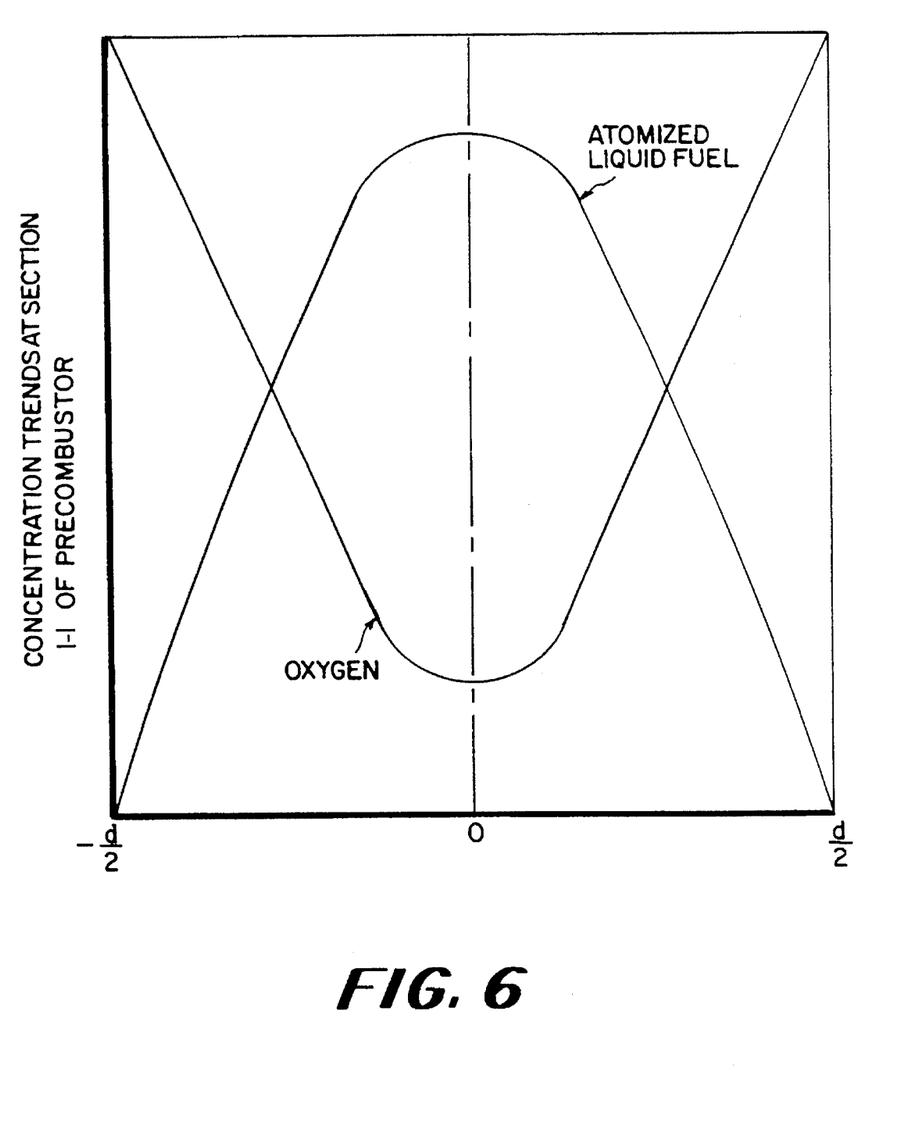
FIG. 6 is a plot of concentration trends at section A—A of the precombustor of FIG. 3 at distances on either side of the center line of the precombustor.

A test firing in a test chamber has shown that the concentration profiles of oxygen-atomized liquid fuel and combustion oxygen inside the precombustor at Section A—A follow a trend opposite to each other, as illustrated in FIG. 6. The center core is generally rich in fuel and the outer core is rich in oxidizer. As described in the U.S. Patent Applications identified above, the flame is created by shielding a fuel-rich oxy-fuel flame inside of a sheath of a fuel-lean or oxygen-rich oxy-fuel flame and confining the shielding of the flame, along a predetermined path, having a predetermined cross-section, to achieve the results of two-phase turbulent diffusion flame production in a precombustor.

The following discussion further illustrates and aids in understanding the present invention:

A) $\alpha<10°$ and/or $V_a<100$ FPS: At angles less than 10° and/or $V_a$ less than 100 FPS, the liquid fuel jets from the injection nozzle do not get adequate aerodynamic shear action, with the atomizing medium flowing inside the atomizing tube. This initial shear is essential, to mechanically break the momentum of individual liquid fuel jets and force a desired droplet size distribution for partial combustion at some distance downstream. Radiant heat feedback from the above combustion process is subsequently utilized, to enhance the vaporization and atomization process. Absence of mechanical shear action at $\alpha<10°$ leads to poor atomization. It is usually seen as sparklers, "oil rain" or traces of smoke in the main flame structure.

B) $\alpha>60°$ and/or $V_a>600$ FPS: At angles greater than 60° and/or $V_a$ greater than 600 FPS, the liquid fuel jets from the injection nozzle are subjected to much higher aerodynamic shear action with the atomizing medium and followed by an increased degree of combustion-induced vaporization inside the precombustor. Resulting mean droplet size distribution is much smaller, along with higher peak flame temperatures and shorter flame. Further $\alpha>60°$ may cause fuel spray to impinge upon the inside surface of the precombustor, which would initiate a localized oxy-fuel combustion and a damage to the precombustor material. It may also overheat the burner parts.

C) $1.2<r_o/r_i<4.0$: This ratio is important in maintaining a desired aspect ratio between intersecting liquid fuel and atomizing medium streams. $r_o/r_i<1.2$ generally leads to higher than desired atomizing medium velocity; whereas, $r_o/r_i>4.0$ leads to lower than desired atomizing medium velocity, for proper liquid fuel atomization. $1.2<r_o/r_i<4.0$ range gives a satisfactory atomization for atomizing oxygen pressures less than 10 lbs/in² (gauge).

D) $0.5<V_f<30$: The oil injection velocity varies, depending on the firing rate (or liquid fuel flow rate), individual hole sizes and total number of holes on the fuel injection nozzle. It was observed during firing that the velocities between 0.5 to 30 feet per second gave a satisfactory atomizing performance, with oxygen as an atomizing medium. Higher than 30 ft/sec fuel oil velocity caused impingement on the internal surface of the precombustor; whereas, less than 0.5 ft/sec velocity was incapable of aerodynamic shearing inside the atomizing tube and leading to insufficient atomization.

E) $0.05<R_{O_2}<1.0$: The ratio $R_{O_2}$ defines the fraction of total oxygen used as an atomizing medium. For a 0.75 to 3.0 MM BTU/Hr firing range, it varies between 0.05 to 1.0; whereas, for a 2 to 20 MM BTU/hr firing range, it varies between 0.05 and 0.5. At the lower $R_{O_2}$ limit (<0.05), the amount of atomizing oxygen was found to be insufficient for aerodynamic shearing, as well as for combustion-induced atomization and vaporization. Depending on the firing rate, the ratio $R_{O_2}$ is adjusted to an optimum value, which offers optimum flame characteristics and a precombustor operating temperature within acceptable limits. Furthermore, an increase in the ratio $R_{O_2}$ or atomizing oxygen was found to quench the combustion process locally inside the precombustor. Due to the above cooling effect, both the flame temperature, as well as the radiant heat flux were reduced, causing insufficient atomization. Even further increase in $R_{O_2}$ leads to spraying of liquid fuel on the internal surface of the precombustor. This is due to reduction in the shielding, confining or shaping effect of the combustion oxygen surrounding the flame envelope. An increase in atomizing oxygen beyond optimum value leads to overheating of the precombustor, due to reduction in shaping and cooling effects by a reduced combustion oxygen.

Figure 7:
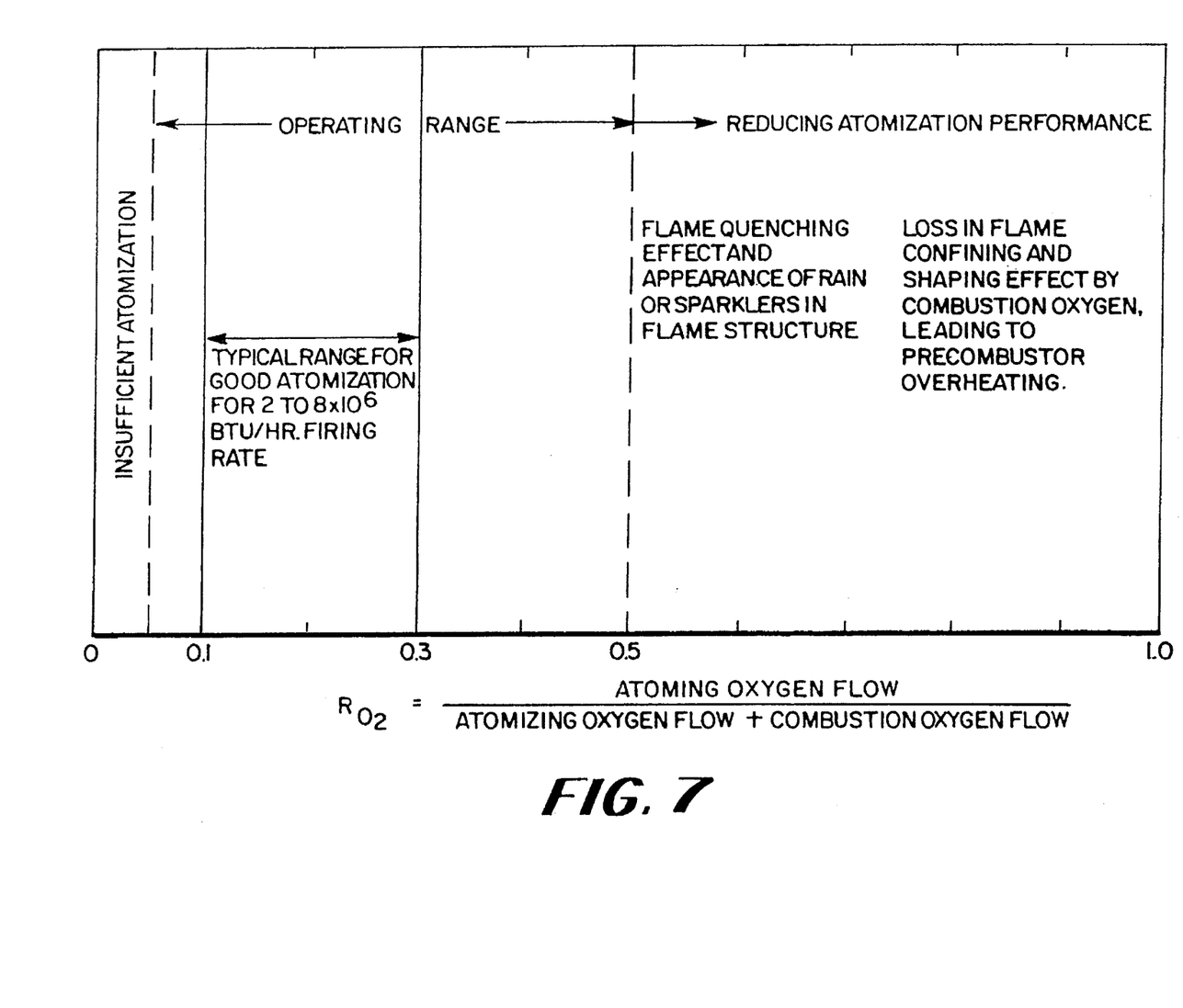
FIG. 7 is a plot of process performance versus various levels of $R_{O_2}$ for the device of FIG. 3.

FIG. 7 shows a typical process performance for 2.0 to 8.0 MM/BTU/Hr firing rate at various levels of $R_{O_2}$. The various ranges shown are for qualitative understanding only. Actual ratio $R_{O_2}$ for good atomization would very much depend on the firing rate, liquid fuel viscosity, precombustor specifications, furnace environment, firing location, etc.

Operation at higher $R_{O_2}$ levels beyond 0.5 is generally associated with higher atomizing oxygen pressure requirements. The present invention uses less than 10 lbs/in² atomizing oxygen pressure, to influence the overall atomization process.

F) $n_j=2$ to 12: The number of liquid fuel injection holes can be between 2 and 12. A single hole nozzle was found to distribute fuel oil unevenly, while forming an off-centered flame in the precombustor; whereas, more than 12 holes offered excessive mixing and aerodynamic shear action, with the atomizing oxygen.

G) $S/(r_o-r_i)=0.5$ to 5.0: This dimensionless ratio is very critical from the standpoint of maintaining appropriate atomizing medium velocity ($V_a$), depending upon the firing rate and introducing the liquid fuel jets at optimum location(s) within the atomizing tube, to effect the initial aerodynamic shear and breaking of liquid fuel momentum. Preliminary atomization done here is completed later on by combustion-induced vaporization. Depending on the firing rate, it was observed during lab testing that the ratio $(S/r_o-r_i)$ less than 0.5 led to poor aerodynamic shear action, and the same ratio greater than 5 led to intense mixing and excessive atomization.

H) $P_{oil}/P_{O2}=0.1$ to 10.0: This pressure ratio range is dependent upon the firing rate. The liquid fuel pressure ($P_{oil}$) increases with flow rate and vice-versa. The atomizing oxygen pressure ($P_{O2}$) is adjusted to a value (and thus setting atomizing oxygen flow or ratio $R_{O_2}$), to obtain a desired flame shape and length. By setting a predetermined atomizing oxygen pressure ($P_{O2}$), one can obtain a desired atomization performance, using the process of combustion-induced vaporization.

I) $L_c/d=2$ to 4: This is a critical design specification for precombustor. The range given here is derived from the measurements of flame luminosity, precombustor temperature profile, precombustor pressure, visual inspection of atomization performance, and overall flame characteristics during experimental test firing. If in fact the operating or design parameters are not observed and $L_c/d$ is less than 2, the diameter of the precombustor becomes too large, which does not permit production of the two-phase flame within the precombustor. This may reduce the confining and shaping effect of the combustion oxygen. The resulting flame may curve up and overheat the furnace roof refractories. On the other hand, if the $L_c/d$ ratio is greater than 4, the precombustor diameter is too small, or the length is too large, which leads to unacceptably high flame temperature within the precombustor.

A further field test of an oxy-oil combustion system according to the present invention was conducted in a commercial fiberglass manufacturing furnace. The furnace was equipped with 8 conventional burners for 100% oxygen-natural gas operation. The object of the test was to evaluate burner operation with low pressure oxygen supply compatible with VSA/PSA systems and at low firing rates. A combustion system according to the present invention was installed for testing with the capability of firing both #2 and #6 fuel oils. The burner was equipped to provide for flame adjustment to enable control of the combustion process within the precombustor, extending the burner turndown ratio and allowing low firing rate operation. The burner was installed in a batch charger at the same position that was used to test a similar burner used for oxy-natural gas combustion.

The test ran for 4 days and the burner was continuously operated on #2 oil with the exception of about 3 hours and firing on #6 oil at the end of the test. As a result of the test, the following observations were made:

1) There were no problems with the burner operation.
2) The firing rate was varied between 5 and 18 gallons per hour (7 gallons per 1 MM BTU) with the average of 12 gallons per hour during the test. These numbers do not reflect the burner turndown ratio but have been set by the furnace heating requirements and glass production rate.
3) The flame was very luminous with a length varying between 1 and 5 ft. depending upon the firing rate of the burner adjustment.
4) Temperatures of the surrounding furnace refractories increased by an average of 50° F. (10° C.) probably due to the very luminous oxy-oil flame.
5) Temperature of the precombustor was similar to the furnace temperature even though the flame was very intense inside the precombustor. Again the intensity of combustion of precombustor is a result of the nozzle design.
6) Inspection of the burner nozzle at the end of the test revealed no deposition or metal discoloration due to the high temperature of the glass furnace.

Owners of the furnace recalled having tried firing #2 oil with air some years back which was unsuccessful since it produced incomplete combustion and made the furnace atmosphere look dusty. The burner according to the present invention produced a very clean, well defined flame with no change in the appearance of the furnace atmosphere.

Having thus described our invention what is desired to be secured by Letters Patent of the United States is set forth in the appended claims.

We claim:

1. A method of producing a low $NO_x$ oxy-fuel flame for heating a chamber to an elevated temperature comprising the steps of:
   producing an oxy-liquid fuel flame of the type wherein a core of fuel-rich phase is surrounded by a sheath of a fuel-lean phase; and
   confining and directing said flame in a cylindrical shape for a distance from a point wherein said flame is generated to a point where said flame can be introduced into the heating device, said distance being determined from the ratio of length traveled to diameter of the flame at its point of origin between 2 and 6 when the heat of generation is between 0.25 and 20 million Btu/hr.

2. A method of producing a low $NO_x$ oxy fuel frame in a stage combustion for heating a chamber to an elevated temperature comprising the steps of:
   producing an oxy-liquid fuel flame of the type wherein a core of fuel-rich phase is surrounded by a sheath of fuel-lean phase; and
   confining and directing said flame in a cylindrical shape for a distance from a point where said flame is generated to a point where said flame can be introduced into the heating device, said distance being determined form the ratio of length traveled to diameter of the flame at its point or origin between 2 and 6 when the heat generation is between 0.25 and 20 million Btu/hr.

3. A non-externally cooled oxy-liquid fuel combustion system comprising in combination:
   an oxy-liquid fuel burner having a housing, wherein said housing is generally cylindrical in shape in relationship to a longitudinal axis and has a first end and a second end, and wherein said housing is adapted to conduct an oxidizing fluid from said first end to said second end of said housing;
   a liquid fuel conduit disposed in spaced relation to and concentrically within said housing, wherein said fuel conduit is generally cylindrical in shape in relationship to a longitudinal axis and has an open first end adapted to introduce liquid fuel into said fuel conduit and a closed second end, wherein the longitudinal axis of said fuel conduit is coincident to the longitudinal axis of the housing, and wherein the closed second end of the fuel conduit is spaced a distance from the second end of the housing;
   at least two fuel ports spaced equidistant from each other and from the second end of said fuel conduit, said fuel ports extending from the interior of said fuel conduit to an outer surface of said conduit, said fuel ports having a generally cylindrical cross-section along a longitudinal axis, the longitudinal axis of each port intersecting the longitudinal axis of said fuel conduit at an angle of between 10° and 60°;
   a precombustor mounted on said burner, said precombustor having a generally cylindrical central passage along a longitudinal axis, one end of which passage is in fluid tight relation to the second end of said housing and a second end adapted to direct said flame, the longitudinal axis of the generally cylindrical central passage being identical to the longitudinal axis of said housing of said burner;
   said precombustor so constructed and arranged that said central passage has a length to diameter (L/d) ratio of between 2.0 and 6.0 where said burner is used to propagate a flame at firing rates of between 0.25 and 20 million Btu/hr whereby said system is ideally suited for combustion utilizing a low pressure atomization medium.

4. A system according to claim 1 wherein there are between 2 and 12 fuel ports in said fuel conduit.

5. A system according to claim 3 wherein the fuel ports have a diameter of between 0.01 inches and 0.20 inches.

6. A system according to claim 3 wherein said precombustor is fabricated from a refractory material with an outside shape adapted for replacing a portion of the wall of a vessel for which the precombustor is intended to be used.

7. A system according to claim 3 wherein said oxy-fuel burner is fabricated from a material selected from the group of stainless steel, alloy steels, high temperature alloys and super alloys or combinations thereof.

8. A system for heating a chamber to an elevated temperature comprising in combination:

a precombustor adapted for attachment to or mounting in a wall of said chamber, said precombustor having at least two generally parallel faces with one of said faces exposed to the inner volume of said chamber, said precombustor containing a passage wherein the passage is generally cylindrical in shape in relationship to a longitudinal axis and extends through said precombustor between said generally parallel faces such that passage has a front end coincident with the face of the precombustor exposed to the inner volume of said chamber, said passage adapted to position an oxy-liquid fuel burner having a cylindrical shape in relation to a longitudinal axis, which is coincident to the longitudinal axis of said passage; and a generally cylindrical oxy-liquid fuel burner of the type having a central liquid fuel conduit, which has an open first end adapted to introduce liquid fuel into said fuel conduit and a closed second end containing at least two fuel ports disposed at an angle to the longitudinal axis of said fuel conduit surrounded by a surrounding fluid passage so that fluid introduced into said surrounding fluid passage surrounds liquid fuel exiting said fuel ports or apertures in said fuel conduit to atomize said fuel and mix said with said liquid fuel prior to exiting said burner, said burner disposed inside said passage in said precombustor so that said passage extends a distance beyond the closed second end of said burner, said distance being fixed at a ratio of between 2 and 6 determined by dividing the length of the distance between the cloud second end of said burner and the front end of said passage in said precombustor by the diameter of said closed second end of said burner where said burner is selected to have a firing rate of from 0.25 to 20 million Btu/hr.

9. A system according to claim 8 wherein said passage in said precombustor is generally cylindrical with a maximum converging or diverging shape at said face exposed to said chamber of fifteen degrees measured relative to the longitudinal axis of said passage.

\* \* \* \* \*

UNITED STATES PATENT AND TRADEMARK OFFICE
CERTIFICATE OF CORRECTION

PATENT NO. : 5,547,368
DATED : Aug. 20, 1996
INVENTOR(S) : Slavejkov et al.

It is certified that error appears in the above-identified patent and that said Letters Patent is hereby corrected as shown below:

Column 10, Line 12
    Delete "form" and substitute therefor -- from --

Column 10, Line 14
    Delete "or" and substitute therefor -- of --

Column 12, Line 11
    Delete "cloud" and substitute therefor -- closed --

Signed and Sealed this

Twenty-sixth Day of November 1996

Attest:

BRUCE LEHMAN

*Attesting Officer*    *Commissioner of Patents and Trademarks*